May 17, 1966  F. REZNICEK  3,251,621
RELEASABLE HAY BALE HANDLING HOOK
Filed June 30, 1964

Frank Reznicek
INVENTOR.

BY *Clarence A. O'Brien*
*and Harvey B. Jackson*
Attorneys

United States Patent Office 3,251,621
Patented May 17, 1966

3,251,621
RELEASABLE HAY BALE HANDLING HOOK
Frank Reznicek, 1412 7th St., Columbus, Nebr.
Filed June 30, 1964, Ser. No. 379,326
8 Claims. (Cl. 294—26)

This invention relates to a manually usable and manipulatable hook for grappling and handling bales of hay and similar hard-to-manage but portable loads, and has to do with a hook which is functionally designed and structurally adapted to positively and reliably dig into the bale but is capable of being tripped and released so that it can be freed and quickly detached as needed.

An object of the invention is to structurally, functionally and in other ways to improve upon prior art hand-manipulated load grappling and handling hooks and, in doing so, so provide a structurally distinct adaptation which not only well serves the purposes for which it is intended but is capable of being satisfactorily manufactured and wherein substantially all of the cooperating component parts are so constructed and interconnected that they are accessible for ready inspection, replacement or repair as the case may be.

In carrying out the invention it will be noted that a hollow specially constructed rigid leg is provided with the pivotally mounted bale engaging hook. This leg is essentially hollow and has a slot opening through one lengthwise side and is provided at longtiudinally spaced points with mounting and stabilizing guides for a spring-loaded slidably mounted rod which constitutes the principal latch member. The outer end portion of the leg is such as to accommodatingly receive and mount the curved and trippable end portion of the shank of the hook. The pivoted shank portion is provided with a shouldered detent which is cooperable with a companion shouldered detent on the outer or hook-freeing end of the latch rod.

The invention also features a leaf spring. This leaf spring. This leaf spring is saddled at one end portion on a median part of the hollow leg and it has a suitably delineated outer free end portion which is contactable with the pivoted end of the shank portion in proper co-acting relationship to the pivot point so that after the bale-engaging hook has been intentionally tripped and released the leaf spring comes into play to swing the hook back to its normal load-engaging position whereupon the coacting detents are re-engaged.

The invention also features a substantially rectangular or an equivalent hollow handle which includes a suitably contoured handgrid. The component members of the frame or handle are hollow so that one end member serves to accommodate a push rod. The push rod in turn is operated by a thumb actuated release button which triggers the push rod.

The invention also features simple and expedient mechanism for transmitting motion from the button controlled push rod to the spring-biased inward end portion of the latch rod characterized by a simple and expedient link. The link is pivoted between its ends, hinged at one end to the latch rod and the other end is cooperable with the forward end of the push rod whereby to transmit motion from the button to the latch rod for purposes of retracting the latch rod and disengaging the bale-engaging hook.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2:
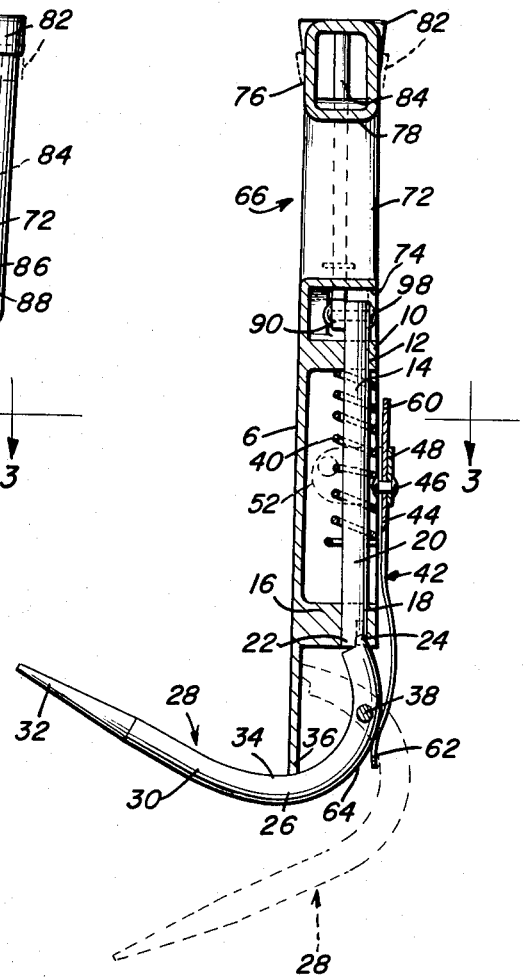
FIGURE 2 is a section taken on the plane of the central section line 2—2 of FIGURE 1 looking in the direction of the arrows and with parts appearing in elevation.
Figure 3:
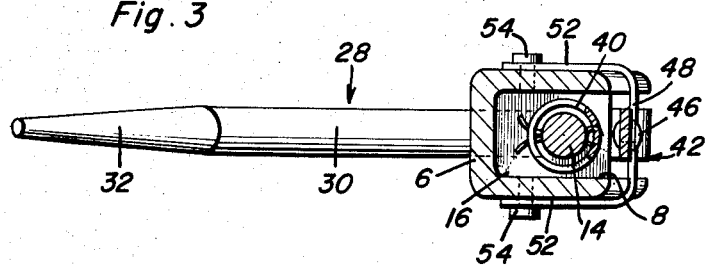
FIGURE 3 is a cross-section on an enlarged scale from on the plane of the section line 3—3 of FIGURE 2.

It will be noted that the handle and leg means comprises a single cast aluminum or an equivalent lightweight but durable adaptation. The leg, which is of suitable length, shape and cross-section is denoted as an entity by the numeral 6. This leg is essentially hollow as is evident from FIGS. 2 and 3 and accordingly may be described as substantially channel-shaped in transverse cross-section. The open side of the channel, the side opening through one edge of the leg is denoted at 8. This permits access to be had to the channel. At one end the channel is provided with a stabilizing partition or divider 10 which has a guide hole 12 therein for an adjacent cooperating portion of the reciprocable and projectible and retractible latch rod 14. The outer end portion of the channel is also provided wth a similar aligned divider 16 which has a guide therein at 18 in alignment with the guide 12. The last-named guide serves to stabilize and control the sliding action of that portion of the latch rod which is denoted generally at 20. The latch rod terminates at its outer end in a shoulder detent 22. This detent is cooperable with a similar shouldered detent 24 on the curved shank portion 26 of the bale-engaging hook 28. The shank proper is denoted at 30 and it is provided at its work-engaging end with a suitably tapered beak or bill portion 32. It will be noted that the edge portion 34 of the shank or shank portion is engageable with an end of the web 36 of the channel for stability and rigidity when the hook is in its normal operating position as shown in full lines in FIG. 2. The illustration in FIG. 2 shows not only the normal full line position but in addition the phantom or dotted line position of the hook, that is the position it assumes when it is released. This is accomplished when the detent 22 is retracted and the detent 24 is accordingly released and capable of swinging from right to left as shown in full and dotted lines respectively. The detent-equipped end portion of the shank is pivotally mounted as at 38 between the walls of the channel so that it assumes the position shown in both rigid and released states.

The portion of the latch rod 14 between the dividers 10 and 16 is encircled by a suitable coil spring 40 the obvious purpose of which is to maintain the latch rod in the hook retaining and stabilizing position appearing in FIG. 2. It will also be noted that a leaf spring 42 is provided. This spring is suitably elongated, is of requisite strength and parallels and in fact substantially covers the open side of the slot 8 which leads into the channel. The median portion 44 of this spring is riveted or otherwise secured at 46 to the bight portion 48 of a U-shaped clip 50. The arm portions 52 of the clip or saddle straddle the side walls of the channel and the free ends are pinned or otherwise fixed in place as at 54. The bight portion 48 bridges an open side of the channel where it is riveted as at 46 to the coacting portion 44 of the leaf spring. The upper end 60 of the leaf spring overlies and tends to shield the coils of the coil spring 40. The free outer end portion of this leaf spring is flared outwardly as at 62 and is positioned and shaped so that it exerts pressure against the convex surface 64 of the shank portion 26. Accordingly, the leaf spring constitutes automatic return means for the released hook 28.

Figure 1:
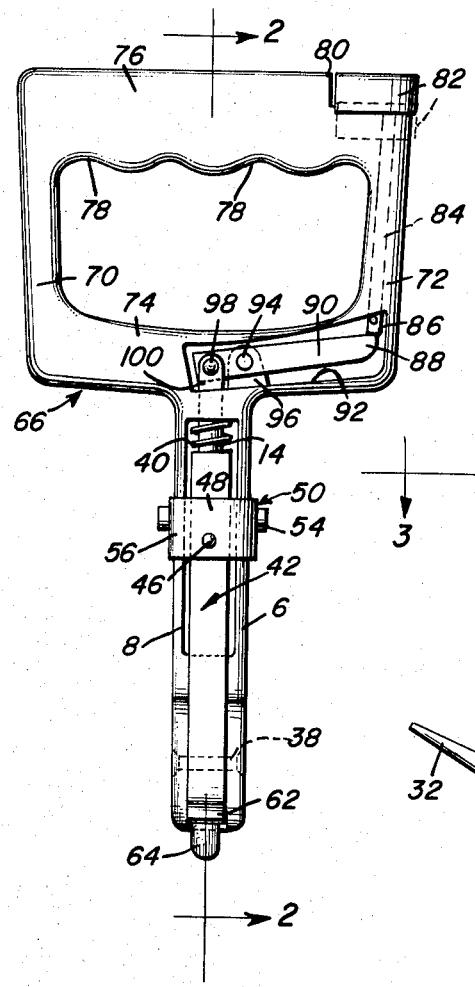
FIGURE 1 is a front elevation of a manually usable and manipulatable releasable type hay bale handling hook constructed in accordance with the invention.

Referring now to the handle means 66 which is integral with the upper or inner end portion of the shank it will be evident that this comprises a substantially rectangular frame embodying end frame members 70 and 72, and longitudinal frame members 74 and 76. The member 76 has its inner edge appropriately contoured as at 78 to provide comfortable seats for the user's fingers. This member 76 constitutes a handgrip proper and it will be noted in FIG. 1 that the righthand end portion is notched out as at 80 to provide a pocket for a suitably shaped pushbutton 82. A push rod 84 is confined in the hollow portion of the member 72. The lower end 86 (FIG. 1) of this push rod is cooperable with a free end portion 88 of a link. This link constitutes a trip finger 90 which is located in a hollow part of the frame member 74 and is exposed for access and repair by way of an access opening 92. The median portion of this finger is pivoted at 94 on a fixed support lug 96 and the other end portion is hinged at 98 to the upper end 100 of the spring loaded latch rod 14.

By positioning the pushbutton 82 in the clearance notch 80 it will be evident that the pushbutton is normally flush with the handgrip but is at one end of the handgrip so that it is out of the way of the normal handgripping position of the handgrip. In other words the handgrip can be used freely as though the pushbutton were not there. When, however, it is desired to trip and release the bale-engaging hook 28 this can be readily accomplished by simply exerting pressure of the thumb against the button 82. This results in a downward movement (FIGS. 1 and 2) of the push rod. The push rod in turn engages the end 88 of the trip finger 90 which in turn pivots at the point 94 and exerts a lifting force on the spring loaded latch rod. The latch rod is thus retracted and consequently the shouldered detents 22 and 24 are disengaged. Accordingly, with the hook 28 thus freed it can be tripped from its normal rigid full line position in FIG. 2 to assume the out-of-the-way easy to disengage position shown in dotted lines. When the pushbutton is no longer needed pressure is removed therefrom and consequently the leaf spring 42 comes into play and exerts pressure against the surface 64 of the curved shank beyond the pivot point 38 and automatically returns the hook to its intended operating position.

It is believed that a careful consideration of the specification in conjunction with the views of the drawing will enable the reader to obtain a full and comprehensive understanding of the construction of the component parts and the manner in which they are arranged and oriented to achieve the behavior and performance clearly illustrated by the views of the drawing. The advantages attending a trippable bale hook to facilitate use of the same are self-evident. Accordingly, a more extended description is regarded as unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A bale hook of the class described comprising an elongated rigid leg substantially channel-shaped in cross-section and provided interiorly with rigidly mounted longitudinally spaced stabilizing dividers having guide holes therein, a reciprocable latch rod confined between the walls of the channel and having end portions slidable in said guide holes, a coil spring confined in the channel and encircling said latch rod, the outer end of said latch rod being provided with a shouldered detent, a bale-engaging hook having a bill portion and a curved shank portion, said shank portion being pivotally mounted between the walls of the channel and terminating in a shouldered detent releasably engageable with the detent on said latch rod, a U-clip saddled over the median portion of said leg and having a bight portion bridging the channel, an elongated leaf spring having a median portion fixed to the bight portion of said U-clip and having a free forward end portion which is positioned opposite and is engageable with a surface of the pivoted portion of the shank of said hook, a frame-like handle fixed to an inner end portion of said leg, said handle being of hollow construction and one of the members thereof being fashioned into a handgrip, and means embodied in the hollow members of said handle for tripping said latch rod.

2. The structure defined in claim 1 and wherein said means comprises a pushbutton recessed in a corner portion of said handgrip, a push rod connected to and actuatable by said pushbutton, said push rod mounted in one of the members of the frame, and a trip link pivoted on another one of said frame members and having one end cooperable with said push rod and the other end hingedly joined to a cooperating end portion of said latch rod.

3. A manually usable hook for grappling and handling a bale of hay or similar hard-to-manage load comprising: a rigid leg having an inward end provided with a handgrip, a bale hook embodying a bill portion and a complemental shank portion pivotally connected with an outward end portion of said leg, a spring-loaded projectible and retractible latch rod slidingly mounted in said leg, said latch rod having an outer end releasably engageable with a coacting trippable end of said shank portion, means carried by said handgrip and adapted to actuate and release said latch rod from engagement with said trippable end, and means carried by said leg for acting on and returning said bale hook to its normal bale grappling and handling state, said first named means embodying a pushbutton operatively mounted on said handgrip and an operating connection between the pushbutton and said latch rod, said operating connection comprising a pivotally mounted trip finger hingedly joined to said latch rod, and a push rod operable by said pushbutton and engaging and triggering said finger.

4. The bale grappling and handling hook defined in claim 3, and wherein the trippable end of said shank portion has a terminal detent and the outer end of said latch rod has a similarly constructed and performing detent which is spring-biased toward and cooperatively engageable with said first-named detent.

5. The structure defined in claim 3, and wherein said second-named means comprises a leaf spring carried by said leg and having pressure responsive coaction with the pivoted end of said shank portion.

6. A manually manipulatable bale handling hook comprising: a rigid leg having a handgrip integral with an inner end of said leg, said handgrip embodying a frame including a grip portion for the user's hand, a push rod enclosed in one end member of said frame, a thumb button operable in a corner of the frame and disposed in line with said one end member and operatively associated with said push rod, a bale handling hook having a shank portion pivotally mounted on an outer end of said leg, a spring-biased latch mounted in said leg and releasably cooperable with the pivoted end of said shank portion, and motion transmitting releasing mechanism in said frame controllable and actuatable by said thumb button and push rod and cooperable with said latch, said latch comprising a reciprocable rod slidingly keyed in a portion of said leg, said rod having an outer end terminating in a shoulder detent cooperable with a companion shouldered detent provided therefor on an adjacent alignable end of said shank portion, said mechanism embodying a link defining a trip finger, said link being housed in a portion of a coacting member of said frame, being pivoted between its ends on a fixed lug, having one end hingedly joined to an inward end of said latch rod, said link extending laterally between said latch rod and push rod and having a trippable free end engaged by an adjacent end of said push rod.

7. The structure according to claim 6 and, in combination, a leaf spring paralleling one side of said leg and having one end fixed on said leg, said leaf spring having a free outer end forcibly pressed against a coacting surface of the shank portion of the hook outwardly of the pivot pin of said shank portion.

8. The structure defined in claim 7 and wherein said leg is provided with and straddled by a U-clip, the latter defining an anchoring saddle and a portion of said leaf spring being joined to the bight portion of said clip.

References Cited by the Examiner

UNITED STATES PATENTS

| | | | |
|---|---|---|---|
| 1,116,688 | 11/1914 | Gaskill | 294—26 |
| 2,138,694 | 11/1938 | Daugherty | 294—26 |
| 2,628,857 | 2/1953 | Nelson | 294—26 |
| 2,631,882 | 3/1953 | Satre | 294—26 |
| 2,873,995 | 2/1959 | Turner | 294—15 |
| 3,005,651 | 10/1961 | Flaker | 294—26 |

GERALD M. FORLENZA, *Primary Examiner.*

A. GRANT, G. F. ABRAHAM, *Assistant Examiners.*